United States Patent [19]

Meyerson

[11] Patent Number: 4,526,593

[45] Date of Patent: Jul. 2, 1985

[54] RESTRICTOR PLUG DEVICE WITH FILTER FOR A GAS SUPPLY SYSTEM

[75] Inventor: Bernard S. Meyerson, Yorktown Heights, N.Y.

[73] Assignee: International Business Machines Corporation, Armonk, N.Y.

[21] Appl. No.: 481,538

[22] Filed: Apr. 4, 1983

[51] Int. Cl.[3] .......................... B01D 46/10; F15D 1/02

[52] U.S. Cl. .................................... 55/385 R; 55/503; 55/505; 138/41; 138/44; 239/DIG. 18; 222/547

[58] Field of Search ............. 55/385 R, 466, 503-505, 55/523; 138/41, 44; 251/118; 222/547; 239/DIG. 18

[56] References Cited

U.S. PATENT DOCUMENTS

| | | | |
|---|---|---|---|
| 1,185,309 | 5/1916 | Haeseler | 55/503 |
| 1,883,720 | 10/1932 | Grimes . | |
| 1,888,150 | 11/1932 | Walker | 55/503 |
| 2,068,858 | 1/1937 | Jones | 55/503 |
| 2,425,634 | 8/1947 | Muffly | 62/3 |
| 2,454,929 | 11/1948 | Kempton | 138/45 |
| 2,553,763 | 5/1951 | Hammon | 55/503 |
| 2,576,610 | 11/1951 | Kunzog | 55/503 |
| 2,645,099 | 7/1953 | Cumming | 138/41 |
| 2,945,430 | 7/1960 | Slick | 55/505 |
| 3,368,587 | 2/1968 | Wells | 138/44 |
| 4,171,209 | 10/1979 | Brown | 55/466 |

*Primary Examiner*—David L. Lacey

*Attorney, Agent, or Firm*—John J. Goodwin

[57] ABSTRACT

A flow control device for filtering and restricting the flow of gas from a gas supply system. Gases stored under pressure in containers or tanks are widely employed in many industries. Such gases are often toxic or explosive, and systems employing such gases must be secure against leaks, clogging and the like. The connector fitting structure includes a flow restrictor plug device and a filter. The connector fitting includes screw threads and may be easily screwed into an end fitting of a gas container and which requires no additional joints to be added to the gas system wherein a minimum volume of gas is trapped external to the gas container in the event of a clogging condition.

1 Claim, 2 Drawing Figures

RESTRICTOR PLUG DEVICE WITH FILTER FOR A GAS SUPPLY SYSTEM

BACKGROUND OF THE INVENTION

1. Field of the Invention

The present invention relates to flow control devices for gases, and more particularly to a device for filtering and restricting the flow of gas from a gas supply system.

2. Description of the Prior Art

There are a number of prior art references which relate to devices having small diameter openings to restrict the flow of gases or liquids therethrough. U.S. Pat. No. 2,454,929 entitled FLOW CONTROL, issued Nov. 30, 1948 to L.A. Kempton describes a flow control device for liquids that maintains a substantially constant rate of fluid flow irrespective if variations in the fluid pressure. The described device incorporates a moving part in the form of a resilient annular member proximate to an orifice such that fluid pressure deforms the resilient member which in turn restricts the flow in the orifice as a function of the pressure. The present invention is distinct from this prior art in that no moving parts or deformable members are employed. U.S. Pat. No. 2,425,634 entitled CONTROL METHOD AND ARRANGEMENT FOR A TWO TEMPERATURE REFRIGERATOR USING A CAPILLARY EXPANSION DEVICE, issued August 12, 1947 to G. Muffly, shows a filter and capillary disc assembly for liquids. The capillary disc structure includes a plurality of separate thin discs arranged in a stack and functions as an expansion device. The structure also includes a moving push rod and bellows which function as a valve. This prior art is also distinct from the subject invention.

U.S. Pat. No. 1,883,720 entitled SLOW LEAK DEVICE, issued Oct. 18, 1932 to L.A. Grimes describes a system which employs the general, well-known technique of placing a gauze or sintered type filter in a valve member.

SUMMARY OF THE INVENTION

Gases stored under pressure in containers or tanks are widely employed in many industries. Such gases are often toxic or explosive, and systems employing such gases must be secure against leaks, clogging and the like.

It is an object of the present invention to provide a restrictor plug device including a filter and flow restrictor bore which may be easily situated into an end fitting of a gas container.

A further object of the present invention is to provide a restrictor plug device for a gas container which is adapted to screw into end fitting mated to the gas container.

Another object of the invention is to provide a gas container restrictor plub device for a gas system which requires no additioinal joints to be added to the gas system.

Still another object of the present invention is to provide a gas container restrictor plug device for a gas system wherein a minimum volume of gas is trapped external to the gas container in the event of a clogging condition.

The foregoing and other objects, features, and advantages of the invention will be apparent from the following more particular description of the invention as illustrated in the accompanying drawings.

DESCRIPTION OF THE PREFERRED EMBODIMENT

Figure 1:
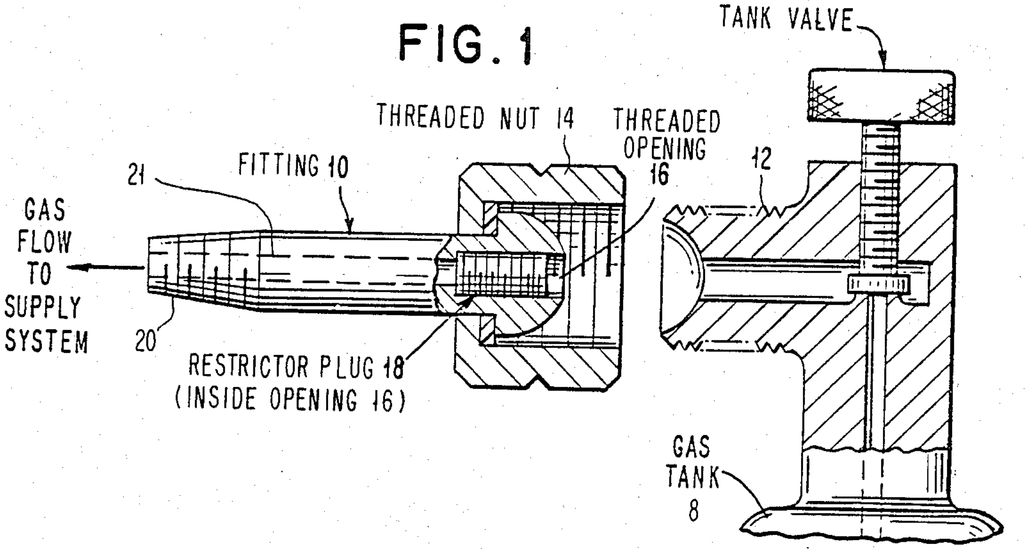
FIG. 1 is a cross-sectional view of a typical end fitting for a gas container coupling between a gas supply system and a gas container.

Referring to FIG. 1, an end fitting 10 for a gas tank, for example, a silane gas tank is illustrated. There are a number of commercially available fittings specifically designed for silane gas tanks, examples being the Compressed Gas Association (CGA) 510 fitting and the CGA 350 fitting which are standard gas tank fittings in the industry and are manufactured by a number of different suppliers.

Figure 2:
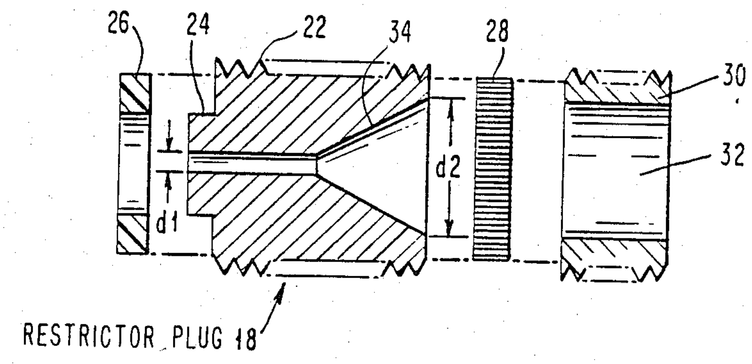
FIG. 2 is a cross-sectional view of a threaded restrictor plug including a filter and a flow restrictor which is inserted into the end fitting of FIG. 1.

The fitting 10 includes an element 14, and fitting 10 is connected to the gas tank 8 at one end by means of said element 14 and to the system gas supply at the other end 20. More particularly, fitting 10 includes an element 14 which contains internal threads such that element 14 can be screwed over portion 12 of gas tank 8 similar to the way a nut screws over a bolt;

In the present invention the fitting 10 is drilled and tapped to provide a female internal threaded opening 16 to accommodate a male restrictor plug 18 which is shown separately in FIG. 2 in more detail; The threaded opening 16 is coaxial with the normal central hole 21 through the fitting 10.

The restrictor plug 18 which screws into threaded opening 16 of FIG. 1 is shown in more detail in FIG. 2 and includes external threads 22 compatible with the internal threads of opening 16 of FIG. 1. The restrictor plug device 18 also includes a lower annular recess 24 in which a plastic ring 26 fits so that the restrictor plug 18 will seat tightly against the bottom of the threaded hole 16 in the fitting 10 of FIG. 1.

A sintered type filter element 28 comprising a cylindrical ring having a sintered type filter material mounted in the center of the ring; fits against the top of the threaded restrictor plug 18 and a threaded set screw 30 having an opening 32 therein is adapted to also screw into the threaded hole 16 in the fitting 10 of FIG. 1 to hold the filter element 28 in place against the end of restrictor plug 18, yet permit filter 28 to be readily removed for purposes of cleaning or replacement. In practice, for silane gas tanks, filter element 28 may have mesh openings in the order of two microns.

The restrictor plug 18 of FIG. 2 further includes an inner tapered bore 34 which extends from a smaller diameter $d_1$ at the bottom to a larger diameter opening $d_2$ at the top. Diameter $d_1$ may be in the order of 0.006 inches while diameter $d_2$ may be in the order of 0.250 inches for use with a gas such as silane, however, the dimensions may vary with the particular application of the invention.

What has been described is a unique flow restrictor and filter plug device for gas tanks that is compatible with CGA fittings that are standards in the industry. The restrictor plug device avoids the uncontrolled release of any gas from the tank because the restrictor plug is an integral part of the tank structure once the fitting and tank are connected and therefore, no failures can occur between the tank and the plug device. Also, the location of the restrictor plug at the exit of the tank insures that any volume of gas trapped in the gas system between the restrictor and the tank valve in the event of clogging of the restrictor plug is held to a minimum (i.e., below 0.5 cubic centimeters). Also, no additional joints or connections in the gas system are required to accommodate the restrictor plug. The restrictor plug has no moving parts and therefore, is not subject to mechanical wear, which is particularly important in silane gas applications where the presence of abrasive silicon dioxide dust particles is a possibility.

Notwithstanding the above advantages gained as a result of the restrictor plug being an integral part of the tank fitting, the restrictor plug is easily removed for service.

In order to clean or change the filtration of prior art devices they must be removed from their in-line position, requiring the making and breaking of external seals, and requiring the retesting of the flow limiting capability of the device and leak checking of the seams at each installation which in the case of usage of a gas that yields particulates would result in unacceptable system downtime. The filter 28 of the device of the present invention is replaceable at each tank change (only parts 28 and 30 must be removed), without any removal of the actual restrictor plug 18 from the fitting 10, and also without the breaking of any external system seal. Thus, the device introduces no additional maintenance to the gas system (i.e., leak detection) during the frequent tank changes required in the production environment.

The restrictor device of the present invention is also a low volume device which permits the pulse purge technique (the sequential pressurization and depressurization of a line to remove residual toxic gases) to be employed. Prior art devices as described do not enable the use of this technique as they are not low dead-space devices.

Having thus described my invention, what I claim as new, and desire to secure by Letters Patent is:

1. A connector fitting structure adapted to be connected to a gas outlet device on a gas tank, said connector fitting having an internal opening along its central axis as a passage for gas from said gas storage tank, said internal opening of said connector fitting incorporating a recess having screw threads on the surface of said recess, a cylindrical flow restrictor plug structure containing screw threads on the external cylindrical side surface thereof, said threads being constructed so as to mate with said thread within said connector fitting recess, said flow restrictor plug having an orifice therethrough extending from a first aperture in one end of said flow restrictor plug to a second aperture in the other end of said flow restrictor plug, said orifice in said cylindrical flow restrictor plug structure varying in diameter from a first larger diameter at said one end of said cylindrical flow restrictor plug structure to a second smaller diameter at said other end of said cylindrical flow restrictor plug structure, and a cylindrical filter means positioned at the said one end of said flow restrictor plug against said first aperture therein wherein both said cylindrical flow restrictor plug structure and said cylindrical filter means are mounted in combination into said recess in said connector fitting structure, said cylindrical flow restrictor plug structure being screwed into said threaded recess in said connector fitting structure and said cylindrical filter means is disposed in said connector fitting structure recess against said one end of cylindrical flow restrictor plug structure.

* * * * *